United States Patent
Nishiumi

[11] Patent Number: 5,265,491
[45] Date of Patent: Nov. 30, 1993

[54] X-Y-Z DRIVE APPARATUS

[75] Inventor: Yasuo Nishiumi, Seki, Japan

[73] Assignee: Nippon Thompson Co., Ltd.

[21] Appl. No.: 901,354

[22] Filed: Jun. 19, 1992

[30] Foreign Application Priority Data

Jun. 19, 1991 [JP] Japan .................................. 3-173300

[51] Int. Cl.$^5$ ............................................ G05G 11/00
[52] U.S. Cl. .............................. 74/479 PH; 74/89.15; 901/16
[58] Field of Search ................. 33/1 M; 74/89.15, 479, 74/479 R, 479 PF, 479 PH; 108/138, 143; 248/657, 661, 913; 901/16

[56] References Cited

U.S. PATENT DOCUMENTS

| 3,279,079 | 10/1966 | Schiler | 33/1 M X |
| 3,432,135 | 3/1969 | Carr | 248/913 X |
| 3,884,363 | 5/1975 | Ajlouny | 901/16 X |
| 4,628,756 | 12/1986 | Kimura et al. | 74/479 PH |
| 4,729,536 | 3/1988 | Scala | 74/479 PH X |
| 4,964,503 | 10/1990 | Nishiyama et al. | 74/479 PH X |

FOREIGN PATENT DOCUMENTS 2120202 11/1983 United Kingdom .................. 901/16

Primary Examiner—Allan D. Herrmann
Assistant Examiner—David W. Laub
Attorney, Agent, or Firm—Skjerven, Morrill, MacPherson, Franklin & Friel

[57] ABSTRACT

An X-Y-Z positioning apparatus includes an X table which may move along an X axis and a Y table which is mounted on the X table and movable along a Y axis. A pair of guide rails is provided on the X table and a pair of sliders mounted at the bottom surface of the Y table is slidably mounted on the pair of guide rails, respectively. The Y table is formed with an opening at a location between the pair of guide rails, through which a Z shaft assembly extends when mounted on the Y table. Thus, no significant moment is applied to the Y table due to the weight of the Z shaft assembly. Preferably, the Z shaft assembly is so arranged with its center of gravity located below the Y table when mounted thereon so as to provide an increased stability in operation.

8 Claims, 2 Drawing Sheets

X-Y-Z DRIVE APPARATUS

BACKGROUND OF THE INVENTION

1. Field of the Invention

This invention generally relates to a position control apparatus, and, in particular, to an X-Y-Z drive apparatus for controlling the position of a desired object in a three dimensional space.

2. Description of the Prior Art

An X-Y-Z drive apparatus for controlling the position of a desired object in a three dimensional space is well known in the art. A typical prior art X-Y-Z drive apparatus includes an X table assembly which is fixedly attached to a stationary object and which is elongated in shape in X direction. The X table assembly includes X guide rails extending in the X direction and a movable X table which is movable as guided by the X guide rails and on which a Y table assembly is fixedly mounted. Similarly, the Y table assembly includes Y guide rails extending in Y direction, which is perpendicular to the X direction, and a movable Y table which is movable as guided by the Y guide rails. In addition, a Z drive shaft assembly is fixedly attached to a side surface of the Y movable table and it includes a Z shaft which may move in Z direction which is perpendicular to both of X and Y directions. As a result, any desired object attached to the Z axis may be controlled in position in X, Y and Z directions.

However, in the above-described prior art X-Y-Z drive apparatus, since the Z drive shaft assembly is fixedly attached to a side surface of the movable Y table, the Y table always receive a moment due to the weight of the X drive shaft assembly. This is disadvantageous since undesired forces are applied to a guide mechanism interposed between the X and Y tables at all times so that a significant wear can occur prematurely. In addition, there is a limit in mounting an object on the Z drive shaft in controlling its position since the weight of such an object tends to increase the moment applied to the Y table.

SUMMARY OF THE INVENTION

In accordance with the present invention, there is provided an improved apparatus for controlling the position of an object in a three dimensional space. The present apparatus includes a first positioning member which is supported to be movable in a first direction horizontally and a first drive means for driving to move the first positioning member along the first direction. The present apparatus also includes a second positioning member which is supported to be movable in a second direction horizontally, which is different from the first direction, and a second drive means for driving to move the second positioning member along the second direction. The second positioning member is movably supported on the first positioning member at least at two spaced apart points. Also provided in the present apparatus is a third positioning member which is supported by the second positioning member to be movable in a third direction, which is different from the first and second directions, such that it is always located between the two spaced apart supporting points between the first and second positioning members.

In the preferred embodiment, the first, second and third directions correspond to X, Y and Z axes in the Cartesian coordinate system, respectively. Thus, X and Y axes extend perpendicular to each other in a horizontal plane and the Z axis extends vertically and thus perpendicular to both of X and Y axes. Preferably, a pair of guide rails is fixedly mounted on the first positioning member spaced apart from each other and a pair of sliders fixedly attached to the second positioning member are slidably mounted on the pair of guide rails, respectively. The second positioning member has an opening. a hole or notch, located between the pair of guide members, each comprised of a guide rail and an associated slider, so that the third positioning member may extend between the pair of guide members.

With the structure of the present invention, no significant moment is applied to the second positioning member so that positioning of a desired object can be carried out at high accuracy at all times.

It is therefore a primary object of the present invention to provide an improved apparatus for positioning a desired object in a three dimensional space.

Another object of the present invention is to provide an improved positioning apparatus high in accuracy and smooth in operation.

A further object of the present invention is to provide an improved positioning apparatus simple in structure and compact in size.

Other objects, advantages and novel features of the present invention will become apparent from the following detailed description of the invention when considered in conjunction with the accompanying drawings.

DESCRIPTION OF THE PREFERRED EMBODIMENTS

Figure 1:
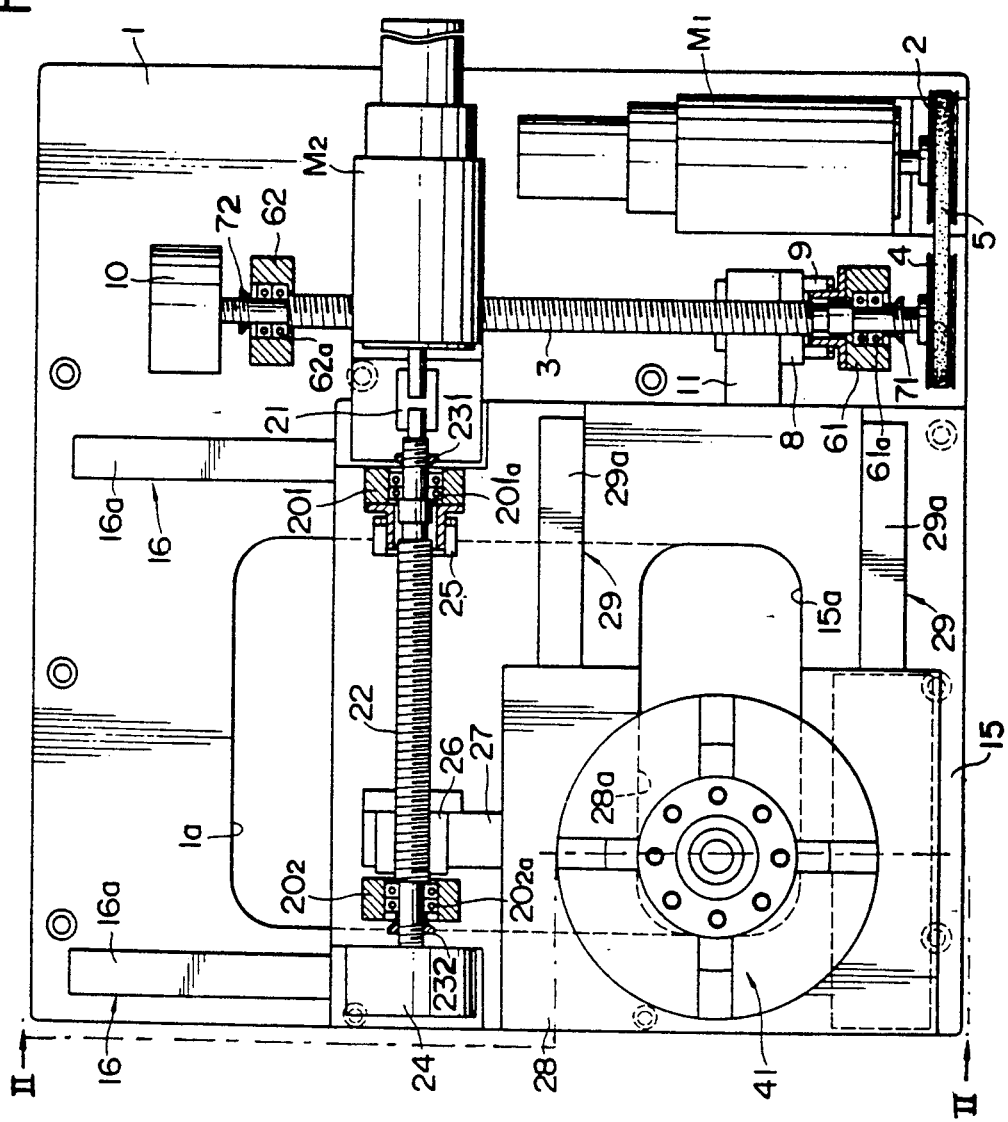
FIG. 1 is a schematic illustration showing in plan view an X-Y-Z positioning apparatus constructed in accordance with one embodiment of the present invention.

Referring now to FIG. 1, there is schematically shown an X-Y-Z positioning apparatus constructed in accordance with one embodiment of the present invention. As shown, the present apparatus includes a base 1 which is fixed in position as, for example, mounted on a frame indicated by the two-dotted line in FIG. 2 so as to provide a free space below the base 1. The base 1 is formed with an opening or cut-away portion 1a which is generally rectangular in shape.

As shown in FIG. 1, a motor M1 is fixedly mounted on the base 1 and a pulley 2 is fixedly attached to an output shaft of the motor M1. A ball screw 3 is disposed as rotatably supported on the base 1 in parallel with the rotating axis of the output shaft of the motor M1 and also in parallel with the longitudinal axis of the rectangular opening 1a. A pulley 4 is fixedly attached to one end of the ball screw 3 and a belt 5 extends around these pulleys 2 and 4 so as to transmit a rotating torque from the motor M1 to the ball screw 3. The ball screw 3 is provided with a screw-free section in the vicinity of each end thereof and the ball screw 3 is rotatably supported at these screw-free sections by means of a pair of rotary bearings 61a and 62a supported by a pair of supporting members 61 and 62 fixedly mounted on the base 1. Bearing nuts 71 and 72 are mounted on the ball screw 3 so as to limit the movement of the ball screw 3 in its axial direction. A stopper 9 is fixedly attached to the supporting member 61 for use in detecting a home position. A brake unit 10 is provided at the other end of the ball screw 3 as fixedly mounted on the base 1.

A ball screw nut 8 is threaded onto the ball screw 3 with a plurality of balls (not shown) interposed therebetween so that the nut 8 may move along the ball screw 3 when a relative rotation is provided therebetween. The nut 8 is connected to an X table or positioning member 15 through a connecting member 11. A pair of guide members 16 is disposed on the opposite sides of the rectangular opening 1a and between the base 1 and the X table 15 as extending in parallel with the ball screw 3. Each of the guide members 16 includes a guide rail 16a, which is fixedly mounted on the base 1 and which is in parallel with the ball screw 3, and a slider 16b (see FIG. 2), which is fixedly attached to slidably mounted on an associated one of the pair of guide rails 16a and preferably a plurality of rolling members, such as balls or rollers, are interposed between the guide rail 16a and the slider 16b.

As a result, the X table 15 may move relative to the base 1 in a first or X direction as driven by the motor M1. The X table may move in either direction back and forth along the guide rails 16a depending on the direction of rotation of the motor M1. The X table 15 is formed with an opening or cut-away portion 15a at its center, which is generally rectangular in shape and extends in a direction perpendicular to the direction of the opening 1a of the base 1 in the illustrated embodiment.

As also shown in FIG. 1, a second motor M2 is fixedly mounted on the X table 15. An output shaft of the motor M2 is operatively coupled to a second ball screw 22 through a coupling 21. In the illustrated embodiment, the ball screw 22 extends horizontally and in a direction perpendicular to the first ball screw 3. The ball screw 22 is also provided with a pair of screw-free sections through which the ball screw 22 is rotatably supported on the X table 15 by means of a pair of rotary bearings 201a and 202a which in turn are supported in position by means of a pair of supporting members 201 and 202 fixedly mounted on the X table 15. Bearing nuts 231 and 232 are provided on the ball screw 22 so as to limit the movement of the ball screw 22 in its axial direction. A stopper 25 is fixedly attached to the supporting member 201 for use in detecting a home position. A brake unit 24 is provided at the other end of the ball screw 22 as fixedly mounted on the X table 15.

A ball screw nut 26 is threaded onto the ball screw 22 with a plurality of balls (not shown) interposed therebetween so that the nut 26 may move along the ball screw 22 in any direction when a relative rotation is created therebetween. The nut 26 is connected to a Y table or second positioning member 28 through a connecting member 27. A pair of second guide members 29 is disposed on the opposite sides of the opening 15a extending in parallel with the ball screw 22 and interposed between the X and Y tables 15 and 28. Each of the guide members 29 includes a guide rail 29a, which extends in parallel with the ball screw 22 and which is fixedly attached to the X table 15, a slider 29c, which is fixedly attached to the bottom surface of the Y table 28 and a plurality of rolling members 29b, balls or rollers, interposed between the guide rail 29a and the slider 29c. As a result, the Y table or second positioning member 28 may move in either direction along Y axis back and forth depending on the direction of rotation of the motor M2. It is to be noted that the Y table 28 is formed with a generally U-shaped opening or notch 28a which is located between the pair of guide members 29 between the X and Y tables 15 and 28.

Also provided in the present positioning apparatus is a Z axis positioning assembly 41 which is fixedly mounted on the Y table 28 by means of a supporting member 43 and which includes a third positioning member or Z shaft 54 which may move vertically relative to the Y table 28. The Z axis positioning assembly 41 includes a shaft assembly 42 and a drive unit.

Figure 2:
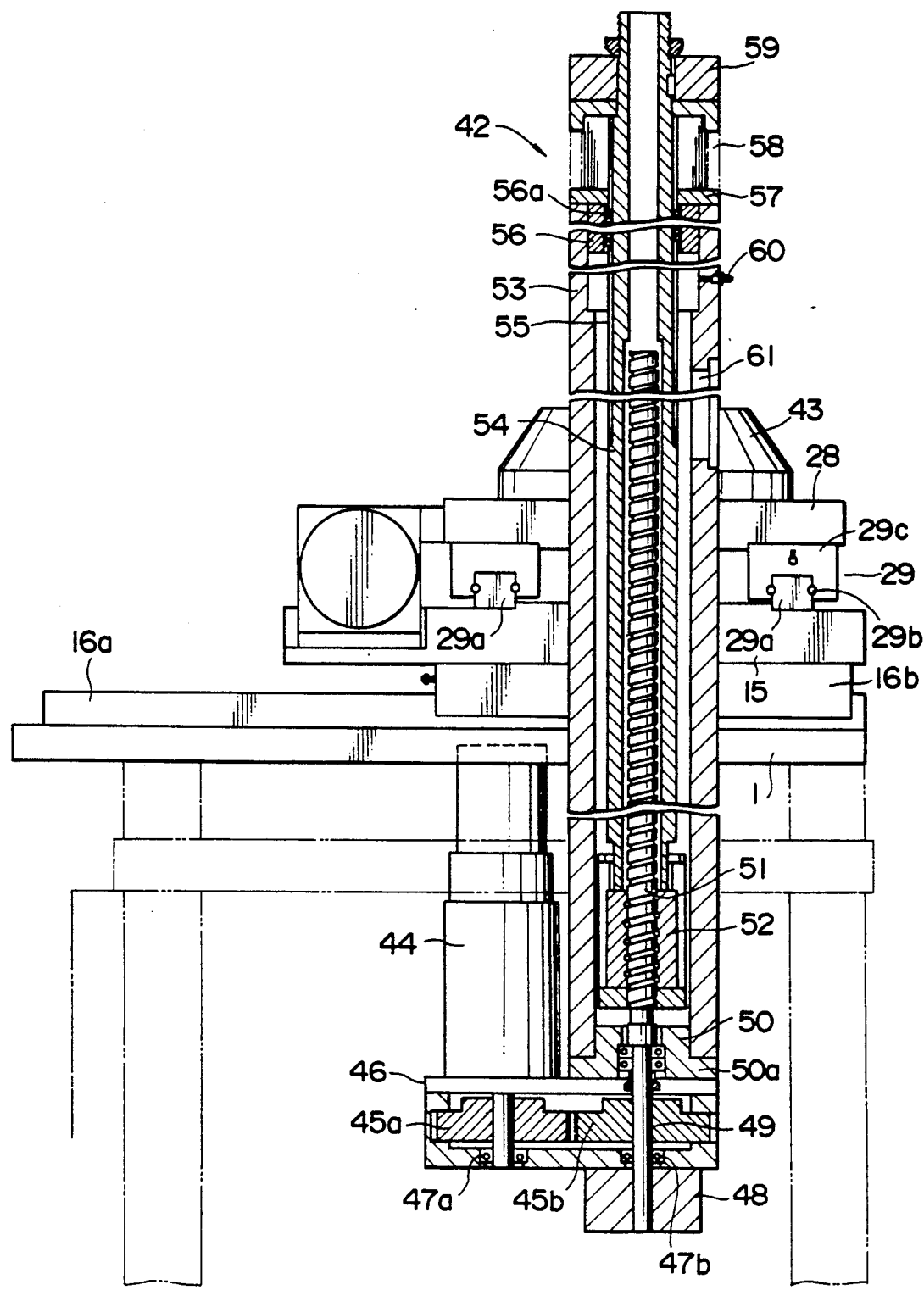
FIG. 2 is a schematic illustration showing generally in vertical view and partly in cross section the positioning apparatus of FIG. 1 when viewed in direction A indicated in FIG. 1.

As best shown in FIG. 2, the shaft assembly 42 is elongated in shape and arranged vertically. The shaft assembly 42 includes an outer cylinder 53 which is fixedly attached to the Y table 28 by means of the supporting member 43. As shown in FIG. 1, the shaft assembly 42 is so mounted on the Y table 28 as fitted in the opening or notch 28a that it is located between the pair of guide members 29 between the X and Y tables 15 and 28. In other words, the shaft assembly 42 or for that matter the Z axis positioning assembly 41 is supported by the Y table 28 at a location between the two supporting points which are defined by the pair of guide members 29. Such a structure is particularly advantageous since no appreciable moment is applied to the Y table 28 due to the weight of the Z axis positioning member 29 itself. In addition, since the opening 28a of the Y table 28 is substantially aligned with the opening 15a of the X table 15 and the opening 1a of the base and a substantial free space is provided below the base 1, the Z axis positioning assembly 41 may be arranged such that its center of gravity is located below the Y table 28 on which the assembly 41 is fixedly mounted. Such a structure allows to provide a significant stability to the present apparatus.

An end fitting member 50 having a flange 50a is fixedly attached to the bottom end of the outer cylinder 53. The end fitting 50 is provided with at least one rotary bearing for rotatably supporting a drive shaft 49 which is connected to a ball screw 51 so that the drive shaft 49 and the ball screw 51 rotate in unison. A bottom support plate 46 is fixedly attached to the end fitting 50 and a third motor 44 is also fixedly mounted on the bottom support plate 46. A gear 45a is fixedly mounted on an output shaft of the third motor 44 and the output shaft is rotatably supported by a rotary bearing 47a at its bottom portion. The gear 45a is in mesh with another gear 45b fixedly mounted on the drive shaft 49 which is also rotatably supported by means of a rotary bearing 47b at its bottom portion. The bottom end of the drive shaft 49 is operatively coupled to a brake unit 48 which is fixedly mounted on the bottom support plate 46. With this structure, when the third motor 44 is energized, a rotating torque is transmitted to the ball screw 51 via the gears 45a, 45b and the drive shaft 49, so that the ball screw 51 can be driven to rotate in either direction depending on the direction of rotation of the motor 44.

A ball screw nut 52 is threaded onto the ball screw 51 with a plurality of balls (not shown) interposed therebetween. Thus, when a relative rotation is created between the ball screw 51 and the nut 52, the nut 52 moves along the ball screw 51 in either direction depending on the direction of relative rotation. The nut 52 is fixedly connected to the bottom end of an inner cylinder 54 which is elongated in shape and located in a space between the outer cylinder 53 and the ball screw 51. The inner cylinder 54 is provided with a plurality of axial grooves 55 arranged in a circumferential direction at its top portion of its outer peripheral surface. An annular-shaped ball spline member 56 is fixedly attached, together with a top lid 57, to the top end of the outer cylinder 53 and the ball spline member 56 is formed with a plurality of axial grooves each aligned with a corresponding one of the axial grooves 55 of the inner cylinder 54 with a plurality of balls 56a interposed therebetween. With this structure, the inner cylinder 54 is prevented from rotating around its own longitudinal axis because of a provision of a spline coupling between the inner and outer cylinders 54 and 53; however, the inner cylinder 54 may move along its longitudinal axis relative to the outer cylinder 53 due to a relative rotation between the ball screw 51 and the nut 52. The length of stroke of the inner cylinder 54 relative to the outer cylinder 53 may be determined by the axial length of the grooves 55.

An operating member 59 is fixedly attached to the inner cylinder 54 at its top end. And, an extendable cover 58 is provided between the operating member 59 and the top lid 57 so that the inner cylinder 54 is prevented from being exposed even if it is driven to move upward relative to the outer cylinder 53. Also provided is a grease nipple 60 as attached to the outer cylinder 53, and a ball screw oil supplying port 61 is also formed in the outer cylinder 53.

In operation, when a command signal is supplied to the motor M1 from a control unit, such as a microcomputer (not shown), the motor M1 is driven to rotate in a selected direction so that the ball screw 3 is also driven to rotate. As a result, the nut 8 is caused to travel along the ball screw 3 so that the X table 15 moves in a selected direction along X axis. In this case, since the Z shaft assembly 41 is mounted on the Y table 28 which in turn is mounted on the X table 15, the Z shaft assembly 41 also moves in unison along the X axis.

Then, when a command signal is supplied to the second motor M2 from the control unit, the motor M2 is driven to rotate to set the ball screw 22 in rotation. As a result, the nut 26 and thus the Y table 28 moves along the Y axis in a selected direction. As previously described, since the Z shaft assembly 41 is mounted on the Y table 28, the Z shaft assembly 41 also moves along the Y axis in unison.

Then, when a command signal is supplied to the third motor 44 from the control unit, the motor 44 is driven to rotate to set the ball screw 51 in rotation. As a result, the nut 52 and thus the inner cylinder and operating member 59 moves in a selected direction along Z axis which is normal to a plane defined by X and Y axes. As a result, the operating member, to which any desired object may be attached, may be controlled in position in the three dimensional space which is defined by three mutually orthogonal axes X, Y and Z.

As described above, in accordance with the present invention, since the Z shaft assembly 41 is mounted on the Y table at a position between at least two supporting or sliding points between the X and Y tables, no undesired moment is applied to any component of the apparatus. In addition, when the Z shaft assembly is so arranged with its center of gravity being located below the Y table on which the Z shaft assembly is mounted, a significantly increased stability in operation can be obtained.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A positioning apparatus comprising:
   a base fixed in space to provide a free space therebelow;
   a first positioning member which is supported on said base to be movable in a planar first direction with respect to said base;
   a first drive means for driving to move said first positioning member along the first direction;
   a second positioning member which is supported to be movable in a planar second direction, which is different from the first direction, said second positioning member being movable supported on said first positioning member at least at two spaced apart supporting points;
   a second drive means for driving to move said second positioning member along the second direction;
   a third positioning assembly which is supported by said second positioning member and which includes a third positioning member movable in a third direction, which is different from the first and second directions, said third positioning member being always located between said two spaced apart supporting points between said first and second positioning members, said third positioning assembly further including a third drive means which is located below said second positioning member and operatively coupled to said third positioning member such that said third positioning member has its center of gravity located below said second positioning member.

2. The apparatus of claim 1, wherein said first, second and third directions are mutually orthogonal to one another and said third direction is normal to a horizontal plane defined by said first and second directions.

3. The apparatus of claim 1 wherein said base includes a first opening; said first positioning member comprises an x-axis table having a second opening; said second positioning member comprises a y-axis table having a third opening; said third positioning assembly comprises a z-axis third positioning member; and wherein said z-axis positioning member extends through said first, second and third openings and perpendicular to said x-axis table and said y-axis table.

4. The apparatus of claim 1, further comprising a first set of guide members interposed between said base and said first positioning member and a second set of guide members interposed between said first and second positioning members.

5. The apparatus of claim 4, wherein each of said guide members includes a guide rail and a slider slidably mounted on said guide rail.

6. The apparatus of claim 5, wherein a plurality of rolling members are interposed between said guide rail and said slider.

7. The apparatus of claim 5, wherein said third positioning member includes a ball screw, an elongated hollow member having a nut threaded onto said ball screw and means for preventing said nut from rotating relative to said ball screw so that the elongated hollow member may move in either direction along said third direction depending on the direction of rotation of said ball screw.

8. The apparatus of claim 7 wherein the means for preventing comprises a spline member associated with said third positioning member and at least one axial groove in said elongated hollow member.

* * * * *